Nov. 30, 1937.  C. W. MANSUR  2,100,864
GOLF CLUB AND METHOD OF MAKING SAME
Filed May 19, 1932  2 Sheets-Sheet 1

Inventor:
Clarence W. Mansur,
by Charles E. Fuller
His Attorney.

Nov. 30, 1937.  C. W. MANSUR  2,100,864
GOLF CLUB AND METHOD OF MAKING SAME
Filed May 19, 1932  2 Sheets-Sheet 2

Inventor:
Clarence W. Mansur,
by Charles E. Mulla
His Attorney.

Patented Nov. 30, 1937

2,100,864

UNITED STATES PATENT OFFICE 2,100,864

GOLF CLUB AND METHOD OF MAKING SAME

Clarence W. Mansur, Malden, Mass., assignor to General Electric Company, a corporation of New York Application May 19, 1932, Serial No. 612,268

10 Claims. (Cl. 273—77)

The present invention relates to golf clubs and especially to golf clubs having heads formed from molded material.

The object of the invention is to provide an improved golf club having a molded head and an improved method of making the same, and for a consideration of what I believe to be novel and my invention, attention is directed to the accompanying description and the claims appended thereto.

Figure 1:
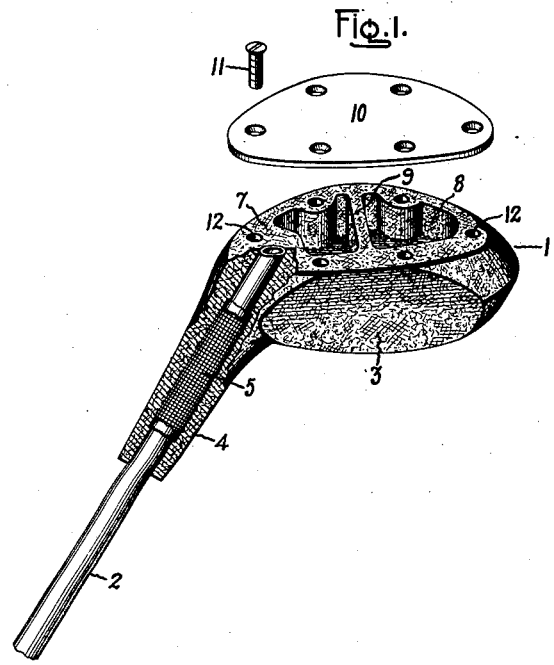
Figure 2:
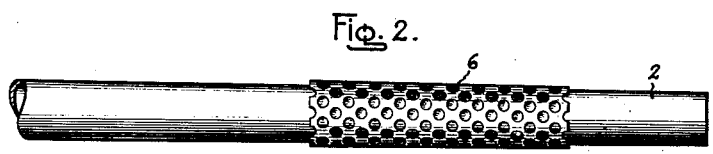
Figure 3:
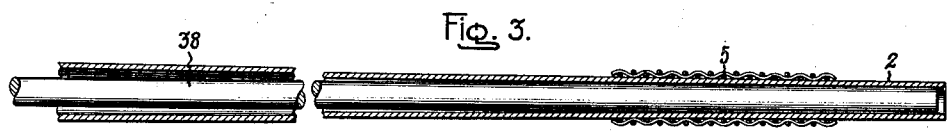
Figure 4:
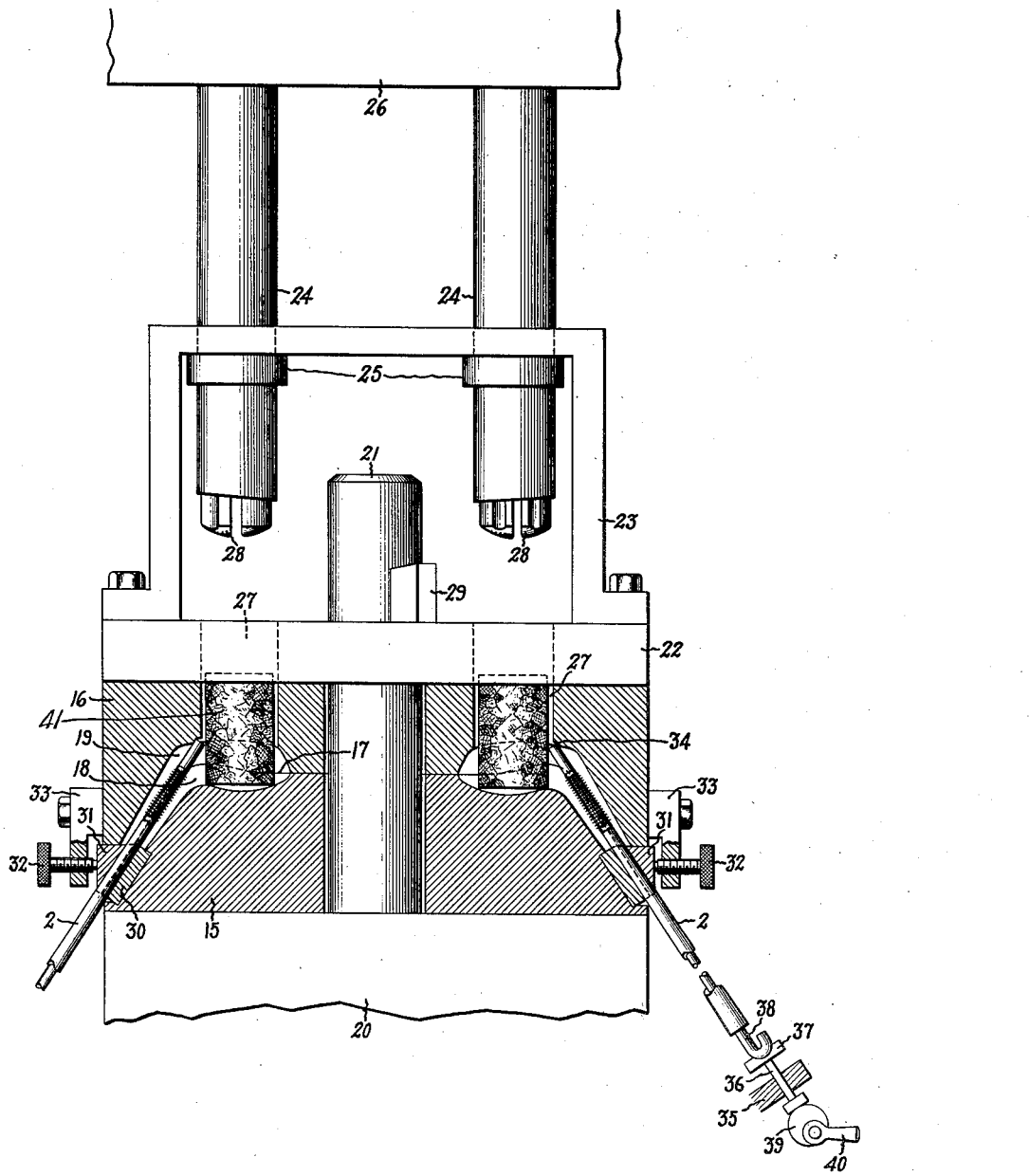

In the drawings, Fig. 1 is a perspective view, partly in section, of a golf club embodying my invention; Fig. 2 is a detail view of a part of a shaft; Fig. 3 is a view of a shaft illustrating an arrangement used for reinforcing it during the molding operation and showing also a modified form of shaft, and Fig. 4 is a sectional view illustrating the method of molding the head on the shaft of the club.

Referring to the drawings, Fig. 1, 1 indicates the head of the club and 2 indicates the shaft. Head 1 is formed from relatively small pieces of cloth, such as cotton duck, for example, united and held in a highly compressed state by a suitable artificial resin, such as a phenolic condensation product, for example. The striking face of the head is indicated at 3 and the shank of the head is indicated at 4. Shaft 2 is a steel tube and the head is molded directly into it, the shaft being provided with a roughened portion as is indicated at 5 to improve the bond between it and the material of the head. Roughened portion 5 may be formed directly in the material of the shaft if the thickness of the material permits, or it may be provided by attaching a metal part to the shaft. In Figs. 1 and 3 it is shown as being formed by attaching a wrapping of wire mesh to the shaft, the same being soldered or brazed into place. In Fig. 2 it is shown as comprising a perforated cylinder 6 suitably soldered or brazed to the shaft. The shaft extends entirely through the shank and head, terminating flush with the bottom 7 of the head. This arrangement provides a strong firm bond between the head and shaft and at the same time requires no additional mechanical fastening means for attaching the head to the shaft.

Comparatively small pieces of cloth, such as cotton duck, united by an artificial resin form a material too heavy for a solid head and to lighten the weight of the head I provide a recess 8 in the head which extends inward from the bottom 7 of the head. Extending across recess 8 is a reinforcing wall 9 which extends in a direction to reinforce the striking face 3. Recess 8 is covered by a metal finishing plate 10 fastened in place by screws 11 which extend through openings in the plate and screw into opening 12 in the head.

The provision of recess 8 which extends from the bottom of the club and is covered by a metal finishing plate is an advantageous feature of the construction in that the recess is easily formed during the molding operation, gives a well balanced distribution of the material of the head, and by being covered by a metal plate on the bottom of the head, the bottom is reinforced without detracting from the appearance of the head. Also, as pointed out more fully hereinafter, this arrangement permits of molding the head in a horizontally split mold, a thing advantageous from a manufacturing standpoint and which serves to give better appearance to the finished head.

Referring to Fig. 4, 15 indicates the lower member or half of the mold and 16 indicates the upper member or half of the mold, the mold being split horizontally on the line 17. The faces of the lower and upper mold members are provided with complementary recesses as is indicated at 18 and 19 shaped to form the head and shank of the club. Lower mold member 15 is suitably attached to and is carried by a bed plate 20 which may be the movable element of a hydraulic press of suitable construction. Projecting upwardly from the center of plate 20 is a post 21 which extends through the center of the mold members. Upper mold member 16 is suitably attached to and is carried by a plate 22 which in turn is carried by a yoke 23 hung on guide posts 24. Posts 24 are provided with collars 25 which limit downward movement of yoke 23. Posts 24 are carried by a fixed or stationary press member 26 suitably supported by the frame of the press. The lower ends of posts 24 are adapted to enter openings 27 in the mold and are provided with projections 28 which form the recesses 8. The two members of the mold are fastened together by a wedge shaped key 29 located in a transverse opening in center post 21.

In lower mold member 15 are clamps for the club shafts comprising base blocks 30 fixed in recesses in the mold member and cover blocks 31 held by clamping screws 32 carried by brackets 33 fixed to mold member 16. In addition to the clamps for the shafts there are provided also adjustable end supports which hold the shafts in the mold against stop shoulders 34. Each end support (only one of which is illustrated in the drawings) comprises a base 35 having an opening in which is located a sliding pin 36 provided with a head 37 to engage with a supporting rod 38.

Pin 36 is adjusted by means of a cam 39 turned by a handle 40. In head 37 is a curved recess into which the bent around lower end of rod 38 fits. Base 35 forms a part of the movable portion of the press, it moving along with bed plate 20.

In Fig. 4 the mold is shown in what may be termed an intermediate position. From the position shown in Fig. 4, the lower mold member 15 and base 20 may be lowered away from upper mold member 16 to open the mold, the upper mold member 16 being then supported by yoke 23 engaging collars 25. Or, from the position shown in Fig. 4, the mold as a whole may be raised bringing the lower ends of posts 24 into openings 27. The details of the structure of the press are not illustrated and described as hydraulic presses of this general type are known and its mechanism forms no part of the present invention. Any suitable hydraulic press structure may be utilized in carrying out my invention.

A mold may be constructed for molding either one or a plurality of heads at a time, a mold for two heads being illustrated in the drawings.

In constructing a golf club, sufficient weight of material comprising relatively small pieces of woven cloth treated with uncured artificial resin is pressed together to form a slug or preform 41 as shown in Fig. 4, some heat being applied to cause the pieces to stick together. The slugs or preforms are then dropped into the mold as shown in Fig. 4. Shafts are clamped in position as shown in Fig. 4, being held by clamping members 31 and supporting rods 38. Shafts 2 are tapered and rods 38 are of a size to fit tightly in the lower ends of the shafts as best shown in Fig. 3. The rods thus form temporary supports or reinforcing means for the portions of the tubular shafts about which the heads are molded. This is desirable because otherwise the tubular shaft end might collapse due to the pressure. The shafts with the rods therein are clamped between shoulders 34 and heads 37. Bed plate 20 with the mold therein, together with the preforms and shafts are then moved vertically by the hydraulic mechanism provided, yoke 23 being guided on posts 24. The ends of posts 24 enter openings 27 forcing the slugs or preforms 41 into the mold and around the shaft ends. Projections 28 enter the mold to form recesses 8. The mold is heated to cure the artificial resin, changing it to its hard infusible state as is well understood.

After the resin is cured, the bed plate 20 is lowered, wedge 29 is removed, clamping screws 32 are loosened, and bed plate 20 is then further lowered moving the lower mold member 15 away from the upper mold member 16, the upper mold member being then supported by yoke 23 which engages collars 25. Shafts 2 with the heads molded thereon are then removed from the mold.

By the above described arangement wherein the mold is split horizontally, the club head can be molded readily directly onto the end of the shaft and the recess formed in the head to lighten the structure by a relatively simple molding operation which can be carried out at low cost. Splitting the mold horizontally has the advantage also that any flash formed along the line of the split is on the side of the club head and when removed does not mar the appearance of the head to the extent it would if it occurred on the top surface of the head.

What I claim as new and desire to secure by Letters Patent of the United States, is:—

1. A golf club comprising a hollow steel shaft and a head molded directly onto an end of the shaft, said head comprising relatively small pieces of woven textile material united and held in a highly compressed state by an artificial resin.

2. A golf club comprising a hollow steel shaft and a head molded directly onto an end of the shaft, said head comprising relatively small pieces of woven textile material united and held in a highly compressed state by an artificial resin, said head having a recess which extends inwardly from its under side to lighten the head, and a plate covering said recess.

3. A golf club comprising a hollow steel shaft having a roughened end portion, and a head molded directly onto said roughened end portion, said head comprising small pieces of spinnable textile fibers united and held in a highly compressed state by an artificial resin.

4. A golf club comprising a hollow steel shaft and a head molded directly onto an end of the shaft, said head comprising relatively small pieces of woven textile material united and held in a highly compressed state by an artificial resin, said head having a recess which extends inwardly from its under side to lighten the head, a wall extending transversely across the recess to strengthen the face of the club, and a plate covering said recess.

5. The method of manufacturing a golf club having a tubular steel shaft and a head formed of molded material which comprises providing a horizontally split mold having an opening through the side corresponding to the bottom of club head, inserting into the mold the shaft end about which the head is to be molded and through the opening in the mold material for the head, and then forcing a member through said opening to distribute the material in the mold and to form a recess in the bottom of the head.

6. The method of manufacturing a golf club having a tubular steel shaft and a head formed of molded material which comprises providing a horizontally split mold having an opening through the side corresponding to the bottom of club head, providing a temporary reinforcing means for the shaft end about which head is to be molded, clamping such end in the mold, inserting through said opening in the mold material for the head, and then forcing a member through said opening to distribute the material in the mold and to form a recess in the bottom of the head.

7. In a device of the character described, the combination of a metal shaft, a foraminous member attached thereto, and a part comprising spinnable textile fibres united by an artificial resin molded directly onto said shaft over the said member, said foraminous member serving as an intermediary for bonding the molded part to the metal member.

8. In a device of the character described, the combination of a metal shaft, a wire mesh wrapped around said metal shaft and united thereto, and a part comprising spinnable textile fibres united by an artificial resin molded directly onto said metal shaft over the wire mesh, said wire mesh serving as an intermediary to bond the molded part to said metal part.

9. A golf club comprising a hollow steel shaft, a foraminous member surrounding an end of the shaft and attached thereto, and a head comprising spinnable textile fibres united by an artificial resin molded onto such end over the foraminous member.

10. The method of manufacturing a golf club head formed of molded material which comprises providing a horizontally split mold having an opening through the side corresponding to the bottom of the club head, inserting into the mold a rod end, and through the opening in the mold material for the head, and then forcing a member through said opening to distribute the material in the mold and around said rod end, and to form a recess in the bottom of the head.

CLARENCE W. MANSUR.